(12) United States Patent
Carlson et al.

(10) Patent No.: US 11,492,027 B2
(45) Date of Patent: Nov. 8, 2022

(54) METHODS AND SYSTEMS FOR WORKER PROTECTION SYSTEM WITH ULTRA-WIDEBAND (UWB) BASED ANCHOR NETWORK

(71) Applicant: Metrom Rail, LLC, Crystal Lake, IL (US)

(72) Inventors: Richard C. Carlson, Manchester-by-the-sea, MA (US); Kurt A. Gunther, Woodstock, IL (US); Sara J. Woitel, Lake Zurich, IL (US)

(73) Assignee: METROM RAIL, LLC, Lakemoor, IL (US)

( * ) Notice: Subject to any disclaimer, the term of this patent is extended or adjusted under 35 U.S.C. 154(b) by 304 days.

(21) Appl. No.: 16/910,804

(22) Filed: Jun. 24, 2020

(65) Prior Publication Data
US 2020/0317241 A1     Oct. 8, 2020

Related U.S. Application Data

(63) Continuation-in-part of application No. 16/460,302, filed on Jul. 2, 2019, now Pat. No. 10,926,783, which
(Continued)

(51) Int. Cl.
*B61L 23/06*     (2006.01)
*B61L 25/02*     (2006.01)
(Continued)

(52) U.S. Cl.
CPC .......... *B61L 23/06* (2013.01); *B61L 15/0027* (2013.01); *B61L 25/021* (2013.01); *B61L 25/025* (2013.01);
(Continued)

(58) Field of Classification Search
CPC .... B61L 23/06; B61L 15/0027; B61L 25/021; B61L 25/025; B61L 27/70;
(Continued)

(56) References Cited

U.S. PATENT DOCUMENTS 2,475,578 A    7/1949  Halstead
2,762,913 A    9/1956  Jepson
(Continued)

FOREIGN PATENT DOCUMENTS

CN      107650949 A  *  2/2018

OTHER PUBLICATIONS

Ceccarelli et al.; Design and implementation of real-time wearable devices for a safety-critical track warning system; 2012 IEEE 14th Intl. Sym. on High-Assurance Systems Engineering; 2012; pp. 147-154 (Year: 2012).*

(Continued)

*Primary Examiner* — Michael J Zanelli
(74) *Attorney, Agent, or Firm* — McAndrews, Held & Malloy, Ltd.

(57) ABSTRACT

Systems and methods are provided for worker protection system with ultra-wideband (UWB) based anchors. One or more wayside units placed on or near a track may be configured to form a work zone network, based on ultra-wideband (UWB) communications, corresponding to a work zone in an area surrounding or in proximity to the one or more wayside units. When the work zone network is formed, at least one wayside unit of the one or more wayside units may be configured to obtain ranging information to a train traversing the track, based on communications of UWB signals with at least one train-mounted unit deployed on the train, and the one or more wayside units are configured to generate, based on the ranging information, notifications relating to the train and/or the work zone.

16 Claims, 3 Drawing Sheets

Related U.S. Application Data is a continuation of application No. 15/623,996, filed on Jun. 15, 2017, now Pat. No. 10,336,353, which is a continuation-in-part of application No. 15/078,427, filed on Mar. 23, 2016, now Pat. No. 10,179,595.

(60) Provisional application No. 62/865,688, filed on Jun. 24, 2019, provisional application No. 62/350,520, filed on Jun. 15, 2016, provisional application No. 62/177,683, filed on Mar. 23, 2015.

(51) Int. Cl.
  *B61L 15/00* (2006.01)
  *G01S 19/17* (2010.01)
  *G08B 25/01* (2006.01)
  *G01S 19/50* (2010.01)
  *B61L 27/70* (2022.01)

(52) U.S. Cl.
  CPC .............. *G01S 19/17* (2013.01); *B61L 27/70* (2022.01); *B61L 2205/04* (2013.01); *G01S 19/50* (2013.01); *G08B 25/016* (2013.01)

(58) Field of Classification Search
  CPC ...... B61L 2205/04; G01S 19/17; G01S 19/50; G01S 1/0423; G01S 1/08; G01S 2205/16; G01S 5/14; G08B 25/016; G08B 21/043
  See application file for complete search history.

(56) References Cited

U.S. PATENT DOCUMENTS

| | | |
|---|---|---|
| 5,198,800 A | 3/1993 | Tozawa et al. |
| 5,554,982 A | 9/1996 | Shirkey et al. |
| 5,620,155 A | 4/1997 | Michalek |
| 5,652,570 A | 7/1997 | Lepkofker |
| 5,727,758 A | 3/1998 | Penza et al. |
| 5,924,651 A | 7/1999 | Penza et al. |
| 5,939,986 A | 8/1999 | Schiffbauer et al. |
| 6,113,037 A | 9/2000 | Pace |
| 6,145,792 A | 11/2000 | Penza et al. |
| 6,208,260 B1 | 3/2001 | West et al. |
| 6,232,887 B1 | 5/2001 | Carson |
| 6,650,242 B2 | 11/2003 | Clerk et al. |
| 7,167,082 B2 | 1/2007 | Stigall |
| 7,624,952 B1 | 12/2009 | Bartek |
| 8,109,474 B2 | 2/2012 | Bartek |
| 8,248,263 B2 | 8/2012 | Shervey et al. |
| 8,344,877 B2 | 1/2013 | Sheardown et al. |
| 8,786,428 B2 | 7/2014 | Sheardown et al. |
| 8,952,805 B2 | 2/2015 | Baines et al. |
| 2010/0102954 A1 | 4/2010 | Radivojevic et al. |
| 2011/0006912 A1 | 1/2011 | Sheardown et al. |
| 2011/0152971 A1 | 6/2011 | Nghiem et al. |
| 2012/0296562 A1 | 11/2012 | Carlson et al. |
| 2013/0166114 A1 | 6/2013 | Baines et al. |
| 2014/0045547 A1 | 2/2014 | Singamsetty et al. |
| 2014/0104081 A1* | 4/2014 | Cross ................... B61L 25/025 340/989 |
| 2015/0060608 A1* | 3/2015 | Carlson ................ B60T 8/1705 246/122 R |
| 2016/0280240 A1 | 9/2016 | Carlson et al. |
| 2017/0015336 A1* | 1/2017 | Bartek .................... B61L 23/06 |
| 2017/0282944 A1 | 10/2017 | Carlson et al. |
| 2017/0320507 A1* | 11/2017 | Denny ..................... E01F 9/30 |

OTHER PUBLICATIONS

Hwang et al.; Development of Wireless Communication-based Safety Equipment for Protection of Trackside Maintenance Workers; INTELEC 2009—31st Intl. Telecommunications Energy Conf., 2009 (Year: 2009).*

Jiang et al.; Ultra-Wide Band technology applications in construction: a review; Organization, Technology and Management—An International Journal; 2010; pp. 207-213 (Year: 2010).*

International Search Report and Written Opinion for PCT/US2016/023754, dated Aug. 8, 2016. (10 pages).

* cited by examiner

METHODS AND SYSTEMS FOR WORKER PROTECTION SYSTEM WITH ULTRA-WIDEBAND (UWB) BASED ANCHOR NETWORK

CLAIM OF PRIORITY

This patent application makes reference to, claims priority to, and claims benefit from U.S. Provisional Patent Application Ser. No. 62/865,688, filed on Jun. 24, 2019. This patent application is also a continuation-in-part of U.S. patent application Ser. No. 16/460,302, filed on Jul. 2, 2019, which is a continuation of U.S. patent application Ser. No. 15/623,996, filed on Jun. 15, 2017, which in turn is a continuation-in-part of U.S. patent application Ser. No. 15/078,427, filed on Mar. 23, 2016, which in turn makes reference to, claims priority to, and claims benefit from U.S. Provisional Patent Application Ser. No. 62/177,683, filed on Mar. 23, 2015. U.S. patent application Ser. No. 15/623,996 also makes reference to, claims priority to, and claims benefit from U.S. Provisional Patent Application Ser. No. 62/350,520, filed on Jun. 15, 2016. Each of the above identified applications is incorporated herein by reference in its entirety.

TECHNICAL FIELD

The present disclosure relates to safety solutions for use in conjunction with railway systems. More specifically, various implementations of the present disclosure relate to methods and systems for a worker protection system with ultra-wideband (UWB) based anchor network.

BACKGROUND

Various issues may exist with conventional approaches for worker protection in conjunction with railway systems. In this regard, conventional systems and methods, if any existed, for worker protection in conjunction with dangers posed by work on or near tracks, may be costly, inefficient, and/or ineffective.

Further limitations and disadvantages of conventional and traditional approaches will become apparent to one of skill in the art, through comparison of such approaches with some aspects of various example methods and systems as set forth in the remainder of this disclosure with reference to the drawings.

BRIEF SUMMARY

System and methods are provided for a worker protection system with ultra-wideband (UWB) based anchor network, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

As utilized herein, "train" refers to any vehicle, car or the like that operates on train racks. This may include vehicles, cars or the like that operating individually (e.g., as single vehicle) or within a group (e.g., one of cars in a multi-car railway train). Further, as utilized herein a train may include powered vehicles, cars or the like (e.g., incorporating power means for driving the car or the vehicle, autonomously and/or based on power provided to the car or the vehicle from external sources) and/or non-powered cars or vehicles.

Figure 1:
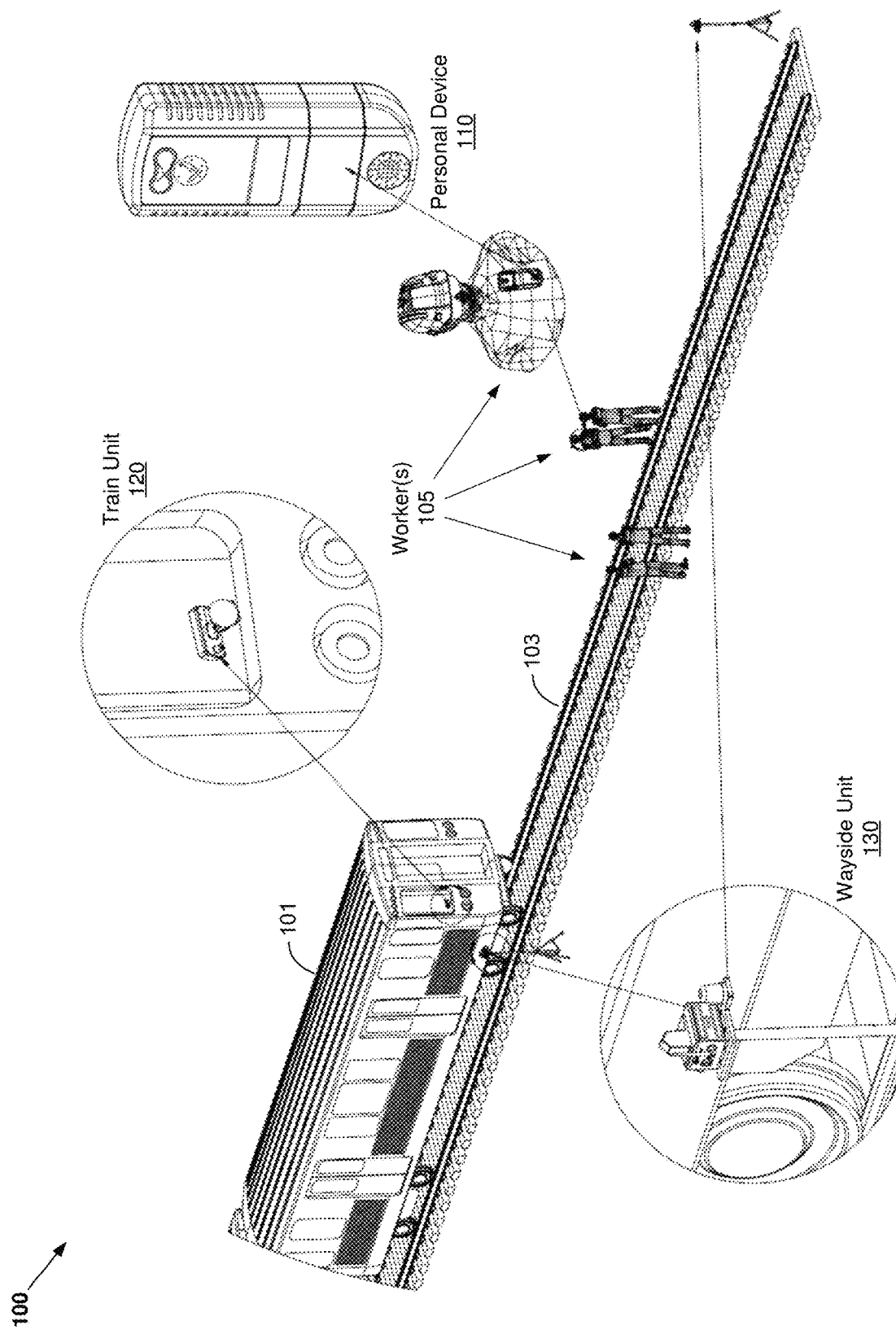
FIG. 1 illustrates an example worker protection system with ultra-wideband (UWB) based anchor network, in accordance with the present disclosure.

FIG. 1 illustrates an example worker protection system with ultra-wideband (UWB) based anchor network, in accordance with the present disclosure. Shown in FIG. 1 is a worker protection system 100, which may be used in providing and/or enhancing workers safety, particularly with regard to dangers posed by trains in railway work environments.

The worker protection system 100 may be configured for implementation and/or deployment within a railway system to ensure or enhance worker protection, by issuing alerts to railroad worker(s) 105 for example, such as when a particular vehicle (e.g., a train 101) is approaching a location where the workers 105 are present. In this regard, the worker protection system 100 comprises one or more devices or components (e.g., deployed within a railway system, such within the trains, on or near the tracks, on the workers, etc.), each comprising suitable hardware (including, e.g., circuitry), software, or any combination thereof configured for supporting worker protection related operations or functions.

For example, the worker protection system 100, as shown in FIG. 1, one or more train units 120 and one or more wayside units 130. The train unit 120 may be configured such as it may be mounted or deployed on vehicles (e.g., one of the railcars of train 101. In particular, the train unit 120 may be that may be mounted or deployed on trains that may pose danger to the workers. The wayside units 130 may be configured for deployment in "wayside" manner—that is, along or near a path of a train (e.g., track 103 traversed by the train 101). The wayside units 130 may be portable devices configured for placement by the workers 105 at a work site (when needed). Alternatively, at least some of the wayside units 130 may be fixed devices, configured for deployment at particular locations (e.g., on or near the tracks), to provide worker protection related functions whenever the workers may be present in the area. For example, in some implementations at least some of the wayside units 130 may comprise an anchor network, comprising a number of anchor devices (also referred to simply as anchors) deployed at particular position on or near train tracks, with these anchor devices being configured to provide the wayside functions.

The worker protection system 100 may also comprise wearable devices, referred to as personal devices (or personal units) 110, which may be worn or otherwise carried by the workers 105 when operating at a particular work site. The personal devices 110 may communicate with one or both of the train unit 120 and the wayside units 130, which may be configured to directly transmit alerts to the personal devices 110 or otherwise trigger generating alerts by the personal devices 110 (e.g., by transmitting signals causing issuing of alerts by the personal devices 110).

In an example operation of the system, the train unit 120 may be configured to trigger alerts under particular conditions—e.g., when it detects it is approaching a work site (or work crew), such as by detecting the wayside units 130 or any personal devices 110 the workers may have. The train unit 120 may also be configured to alert the vehicle operator—that workers are in proximity, and may provide additional information in this regard (e.g., display the number of detected workers, indicate distance to workers, indicate whether workers have confirmed the alarm, etc.). Similarly, the wayside units 130 may be configured to trigger alerts under particular conditions, such as when it detects the approaching vehicle (the train 101).

The personal device 110 may be designed and/or configured as a small and light device, with low profile so as not to impede normal working activities of the worker(s) 105 wearing it. For example, the personal device 110 may be worn by either a clip, arm band or belt clip. The personal device 110 is operable to issue an indication (e.g., audio, visual, tactile, etc.) to alert the worker wearing it of an approaching object (that poses a safety concern). For example, the personal device 110 may comprise audio warning component (e.g., a speaker), a visual warning component (e.g., a multi-color LED indicator), tactile indicator component (e.g., vibration), etc.

Further, the personal device 110 may be operable to enable the user to provide feedback in response to issued alarm indication. For example, the personal device 110 may comprise an alert acknowledgement element, such as a confirmation button to silence alarms (i.e., a "mute" or "confirm" switch). To improve and optimize wearability of the personal device 110, its housing may be designed to include various features to support multiple mounting locations and/or approaches (e.g., clipped on the user's clothing/equipment, around the user's wrist, etc.). The personal device 110 may be configurable to provide alerts adaptively based on particular pre-set conditions—e.g., to provide at least a 15 second warning in line of sight conditions, when a train is approaching at 60 mph.

In an example implementation, the personal device 110 may be a work vest equipped (e.g., embedded therein) with the necessary electronics and related suitable circuitry for supporting functions attributing to the person device 110 (e.g., communication functions, alert related functions, etc.). For example, the vest may be equipped (e.g., embedded therein) with the necessary electronics for generating audible and/or visual alarms (e.g., when a train is approaching, which would be communicated/propagated along the anchors. Other options other than vests may also be employed, such as helmets, armbands, belts, wrist bands, back packs, etc., which may similarly be equipped with necessary electronics and associated suitable circuitry for supporting functions attributing to the person device 110.

The train unit 120 may be configured either as a portable device (e.g., brought into and that may be mounted to vehicles only when needed), or as permanently mounted or integrated component (of vehicles). Implementing the train unit 120, which typically is the most costly component of the system, as a detachable device may be desirable as it allows use of small number of the train unit 120, being only moved into and used on vehicles being operated, thus reducing the deployment cost significantly. The train unit 120 may be operable to broadcast signals that are specifically configured to interfaces with other components of the system, such as the wayside units 130 and/or the personal devices 110, to provide increased distance. Further, in some instances the train unit 120 may be operable to, when worker(s) is/are detected, provide indication to the operator(s) of the vehicle, such as by displaying and/or sounding warnings. In some instances, the train unit 120 may provide detailed information (rather than generic warning), such as indicating the quantity of workers detected, and the approximate distance to the workers.

While the train unit 120 is illustrated in FIG. 1 as a singular physical component, incorporating all components (including antennas), the disclosure is not so limited, and in some instances train units may be implemented to support distributed arrangements—e.g., comprising a plurality of physical units, which may be placed at different locations or positions within the vehicles. For example, train units may comprise a first physical unit comprising the antennas (and related circuitry or other support components), and one or more other physical units housing the remaining components of the train units. In this regard, the physical antenna unit may be configured for optimal placement (e.g., on roof of front car in train) which may be deemed optimal based on one or more placement criteria (e.g., optimal broadcast characteristics, maximum safety to operators and other individuals on train, such as passengers, etc.).

The wayside units 130 is configured to operate as stand-alone device, placed on or near the path of the object(s) being detected. For example, the wayside units 130 may be attached to placement component (e.g., a tripod), and is temporarily placed near the track 103. The placement of the wayside units 130 may be subject to particular criteria—e.g., no closer than certain distance (for example, four feet) to the nearest rail, at or in advance of each end of a work zone. The wayside units 130 may be utilized in areas where trains or other vehicles may not have vehicle mounted companion devices (e.g., train unit 120). The wayside units 130 may broadcast signal(s) when a train or vehicle passes. Further, in some instances, the wayside units 130 may have dual functionality as these devices may interface with train units (e.g., the train unit 120) while also broadcasting signals to personal devices. In addition, in some instances, the wayside units 130 may be configured to respond to transmissions from the personal devices. In this regard, some instances the personal device may be configured as a transmitter only—that is, lacking the capability to receive signals (and thus take actions based on such reception). In such implementations, the personal device may only transmit signals for indicating its rough proximity, with the wayside units (e.g., anchors) transmitting only after receiving a message. Thus, the personal device would effectively broadcast to any anchor that can "hear" it rather than requiring use of targeted (addressed) transmissions. Such approach may be utilized because UWB reception operations may require more power than transmission, and as such eliminating reception functions may be desirable for systems such as the personal device, which may have limited power supply (as it may typically be battery operated); whereas transmitting periodically has minimal impact on battery life. The disclosure is not so limited, and accordingly in an alternative approach, personal device may be configured to transmit and receive, but to do so in power efficient manner—e.g., transmitting and receiving for a short period of time, then power down or transition to low power mode (e.g., sleep mode), to save battery life.

In various example implementations in accordance with the present disclosure, worker protection systems (such as the worker protection system 100 of FIG. 1) may be configured for utilizing ultra-wideband (UWB) technology, such as to determine distance between trains, work zones, and workers. In such implementations, each of the components of the system (e.g., the train unit(s), the wayside units, and the personal units) may be configured to enable and support UWB-based communications. Thus, the system components may be configured to utilize UWB ranging for precise location and/or speed determinations. The system may operate minimally with an equipped train (e.g., incorporating train unit(s)) and a wayside/anchor network, comprising wayside units (including anchors). The personnel device is an option that offers additional protection.

The UWB-based anchor network consists of anchors that contain redundant UWB ranging radios as well as antennas. The radios communicate through a high-speed mesh network both to adjacent anchors as well as to a back office. The exact location and speed of each train is communicated to the back office as well as the health status of the network. The back office may communicate a work zone and decreased speed limit to the anchors which communicates this information to the train. In an example implementation, anchors may be configured to communicate and/or propagate work zone designations (e.g., wirelessly and/or via wired networking based connections, such as Ethernet), with a specified number of anchors as needed on both or either side of the work zone. Such enhanced warning capabilities may be used to allow for giving as much advance notice as required by the work zone in a variety of locations, such as around curves and in other areas of limited visibility. Similarly, such enhanced warning capabilities may be used to allow for appropriate advance warning times to handle high train speeds which would require notification further away from the work zone.

In another scenario, UWB-based anchors may become activated as a work zone when an equipped worker was detected. The UWB radios in the worker vest would communicate to the anchor its presence, and, if configurable parameters were met, a work zone and speed limit may be implemented. This is illustrated and described in more detail with respect to FIG. 2. The anchor network may communicate the activation of the work zone (and related information) to the back office. This is illustrated and described in more detail with respect to FIG. 3. As the train approached the worker and configurable parameters were met, the train would either slow or stop prior to entering the work zone.

The anchor network may be configured to determine the location and speed of each train, and may be configured to meet regulatory guidelines on work zones—e.g., ensuring a 15-second warning with a train travelling 80 mph as opposed to 20 mph requires additional distance. In this case, the anchor network as opposed to the actual anchor that the workers are activated in may alert the train. If anchors A, B, C, and D are mounted in that order and workers activate D, any of the preceding anchors may alert the train depending on speed. This ensures the workers and train operator receive a 15-second alert.

In an example implementation, each wayside device (e.g., anchor) 130 may comprise suitable circuitry for supporting alerts (e.g., audible and visual alerting mechanism). If a work zone is set either by the back office or by the worker vests, the anchor will visibly change either by a flashing sequence, change in color, or other visible cue. If a worker vest is detected, an audible chirp may be emitted to ensure that the worker is aware it was detected. If a train is entering the work zone, alarming of the anchor will occur alerting the workers in the vicinity that a train is approaching.

In an example implementation, each personnel device 110 may be configured to support use of audible, visual, and vibratory alarms (e.g., if a train is detected). Once alarmed, the worker could silence the alarming by hitting a confirmation button. When all personnel devices in an area are confirmed, the anchor may be configured to automatically stop alarming. The anchor would then remain in a warning state until the train has cleared the area. The warning state may comprise periodic visual and/or audible indications (e.g., at a reduced intensity and/or repetition rate).

In an example implementation, the train unit 120 may comprise UWB ranging radio and antenna, suitable housing (e.g., hard chassis or enclosure, for enclosing other components, particularly electronics/circuitry, which may be susceptible to damage in train environments), and user interface. The train operator will receive an audible and visual alarm on the User Interface. The User Interface may communicate the distance to the work zone and the new speed limit. When worker devices are present, the number of workers and whether they have confirmed their alarm is also communicated.

In some implementations, the personal device may be a scaled down version that consists of transmit only version of the UWB technology. In this scenario, the personal device would not contain audible, visual, or vibratory alarming. Alarming would occur on the anchor and the train user interface. This implementation allows for a smaller, embedded radio in the worker vest in order to obtain much longer battery life. The smaller implementation also allows for better movement of the worker and more options for deployment.

In scenarios with no anchor network is available, portable UWB wayside units may be deployed. These portable units may be set before a work zone, typically on a tripod, and communicate work zone status directly to the train. Personnel devices may be deployed, and both personnel devices and trains will behave in the same manner as if there was an anchor network. Accordingly, references to "anchors" and "anchor network" may comprise both fixed/pre-deployed UWB anchors as well as portable UWB wayside units deployed temporarily and/or only when and where needed (e.g., at work sites).

Figure 2:
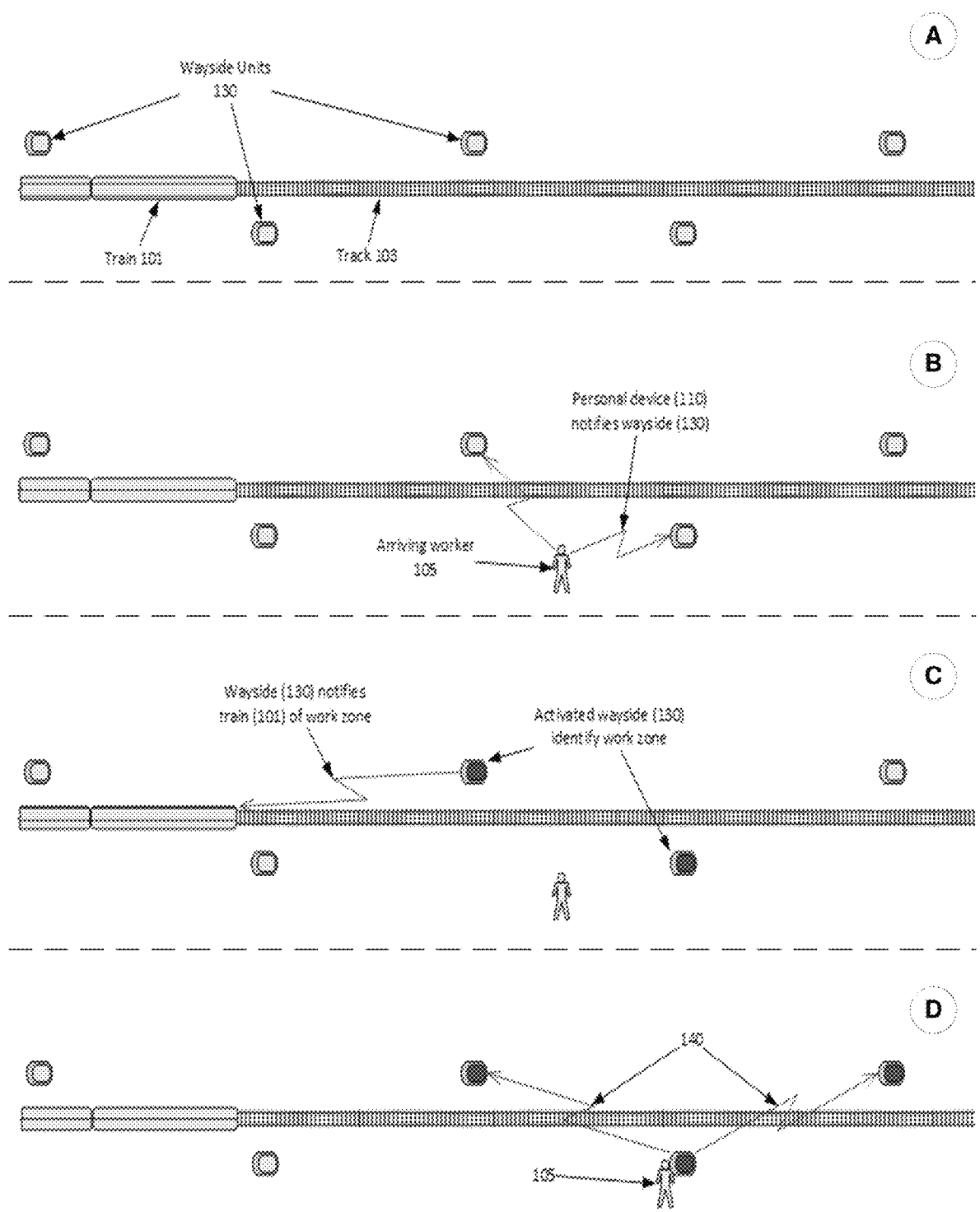
FIG. 2 illustrates an example use scenario of a worker protection system with ultra-wideband (UWB) based anchor network, in accordance with the present disclosure.

FIG. 2 illustrates an example use scenario of a worker protection system with ultra-wideband (UWB) based anchors, in accordance with the present disclosure. Shown in FIG. 2 is a sequence of actions during an example use scenario of worker protection system with ultra-wideband (UWB) based anchors in accordance with the present disclosure (e.g., the worker protection system 100 of FIG. 1).

Illustrated in FIG. 2 is a sequence of events and/or actions that may occur when a work zone is automatically formed and activated (e.g., by UWB-based anchors of a worker protection system, such as the anchors/wayside units 130 of the worker protection system 100 of FIG. 1) in an area where a worker is present when the worker is detected. For example, in the initial state (denoted as 'A' in FIG. 2), no workers are present within operating range of the anchors/wayside units 130, and thus no work zone is formed even as the train 101 traverses the track 103 within communication range of the anchors/wayside units 130 deployed on or near the track 103.

In subsequent state/action (denoted as 'B' in FIG. 2), worker 105 enters a zone covered (e.g., within communication range, particularly UWB communications) by one or more of the anchors/wayside units 130. In instances where the worker 105 is wearing or carrying personal device 110, the personal device 110 may initiate communications with any anchors/wayside units 130 that are in range within the area that the worker entered.

Then, in subsequent state/action (denoted as 'C' in FIG. 2), a work zone is automatically formed and activated, corresponding to and comprising "activated" anchors/wayside units 130—e.g., in response to communications with the personal device 110 of the worker 105. In this regard, it should be understood that such work zone is not fixed; rather, the work zone may be propagated beyond the anchors that are in communication with the personal device 110 and/or may change (e.g., based on movement of the worker 105). With the work zone activated, when the train 101 train approaches work zone, the train unit 120 may start communicating with any of the anchors/wayside units 130 within or associated with the work zone—that is, the "activated" anchors, and thus the train 101 would be notified of the work zone as the train 101 approaches the zone.

The result in the train in either case may be a notification to the train operator (e.g., audible and/or visual), a restricted speed limit (which may be automatically enforced, either slowing the train or penalty stopping the train), or automatically stopping the train, regardless of its speed, prior to entering the work zone to ensure that the operator takes time to assess the worker(s) present prior to proceeding at restricted speed.

In some implementations, the anchor network may have the capability to detect the number of workers present.

In some implementations, the personal devices 110 (e.g., used by worker 105) may comprise suitable circuitry and related hardware (e.g., electronics) configured to provide alarms (e.g., an audible and visual alarm), such as when a train is approaching, which may be communicated/propagated along the anchors.

In some implementations, anchors may be equipped with audible and visual alarms (so that the worker vests don't have to be equipped). The visual alarm may be a flashing strobe or other attention-getting indications In some implementations, the personal devices 110 may incorporate an input component (e.g., a confirmation button and related circuitry) to receive confirmation form the worker, and to wirelessly communicate (wirelessly) a corresponding indication to the anchor, and then to the train—that is, wireless relay—to allow the train operator to know if the workers have confirmed knowledge of an approaching train. If all workers present have confirmed, the train may be allowed to travel at a higher restricted speed (e.g., 10 mph instead of 3 mph). The train unit 120 may be configured to provide to the train operator various indications relating to the work zone—e.g., to alert the train operator prior to, and in advance of entering the work zone (e.g., "Work Zone Ahead"), and then at the entry point to the work zone ("Entering Work Zone"), and finally when exiting the work zone (e.g., "Leaving Work Zone").

In some implementations, the train operator may be notified visually and/or audibly (e.g., via the train unit 120) of the number of workers as well as how many have confirmed the alarm before or as they enter the work zone.

In some implementations, the alarm in the work zone may automatically decrease to an alert when all workers had confirmed.

In an alternative use scenario (denoted as 'D' in FIG. 2), the work zone may be formed and/or activated manually. In this regard, the worker 105 may manually activate a work zone such as by interacting with one of the anchors/wayside units 130 (e.g., by pressing a work zone button on the anchor(s) located at the work site, to activate the appropriately size a "work zone"). This may be done, for example, where the worker 105 may not have or carry a personal device 110.

Once activated, the anchor or anchor network (e.g., anchors creating collectively a work zone where the worker is present, such as by communicating (140) with one another) may be configured to communicate presence of workers to approaching trains. By activating the work zone, the train may receive a restricted (decreased) speed limit prior to approaching the work zone. In some implementations, the anchors and train may each provide audible and visual alarms (for the workers and the train operator, respectively) when the train enters the work zone.

In some instances, less urgent alerts may be given to the train operator and workers based on configurable parameters when the train nears the work zone, followed by the urgent alert upon entry in the work zone. Further, as described before (e.g., with respect to automatically activated work zones), the train may be automatically stopped prior to entry of the work zone or the speed automatically decreased to comply with the configured work zone speed restriction.

Figure 3:
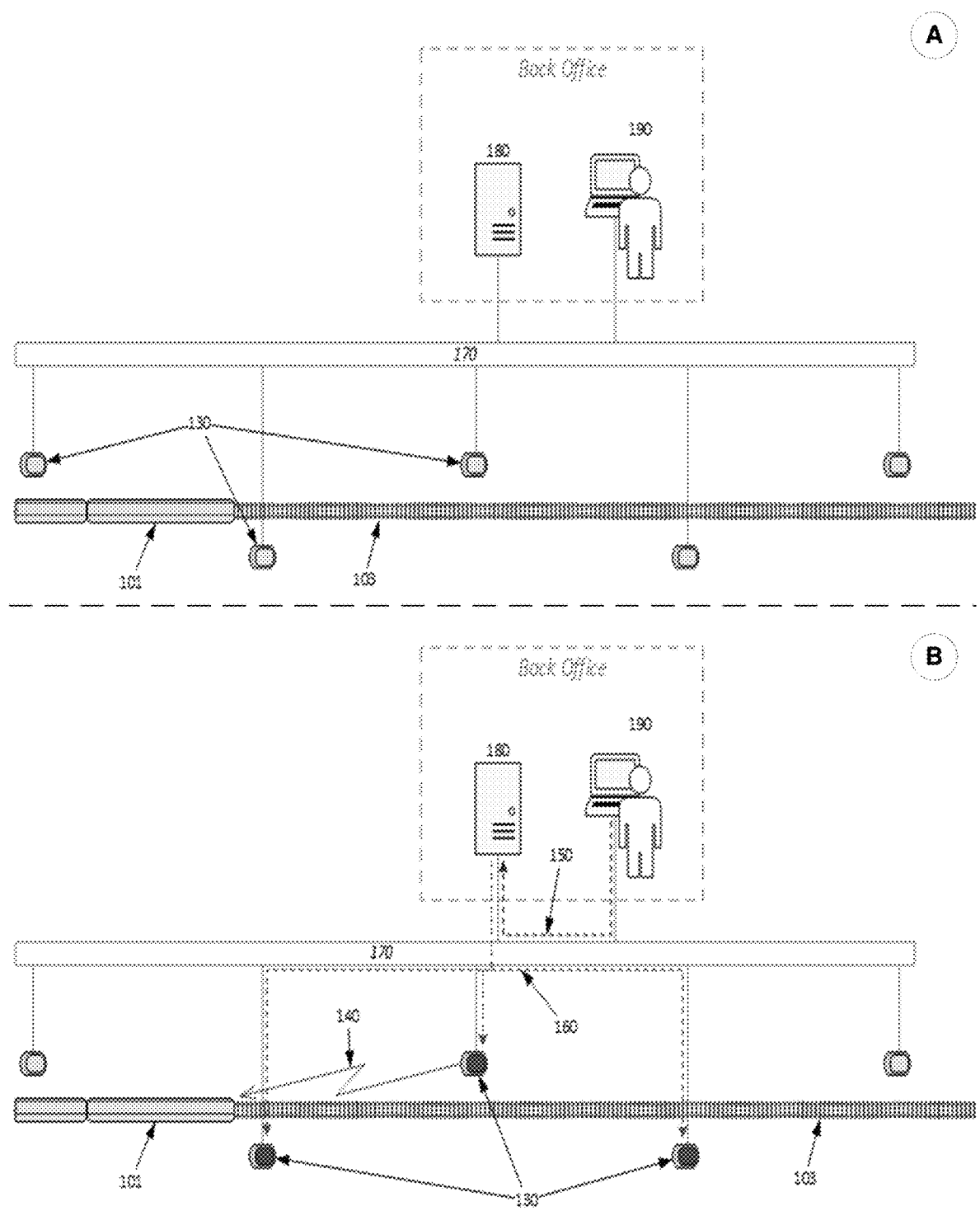
FIG. 3 illustrates an example use scenario of a worker protection system with ultra-wideband (UWB) based anchor network and back office, in accordance with the present disclosure.

FIG. 3 illustrates an example use scenario of a worker protection system with ultra-wideband (UWB) based anchors and back office, in accordance with the present disclosure. Shown in FIG. 3 is a worker protection system with ultra-wideband (UWB) based anchors and back office in accordance with the present disclosure (e.g., the worker protection system 100 of FIG. 1).

In this regard, in addition to the components previously described, as shown in FIG. 3 the worker protection system 100 also comprises a back (central) office. The back office may comprise a server 180 and a terminal 190. The server 180 and the terminal 190 may be configured for allowing operators in the central office (e.g., dispatchers) to interact with, and if needed control operations of the worker protection system 100. In this regard, the terminal 190 also may be configured for providing feedback to the operators, such as alerts, notifications, and the like. The back office may be connected to the anchors (e.g., anchors/wayside units 130) via communication backbone 170, to facilitate control thereof. Further, in some instances, the backbone 170 may also be used to facilitate interactions among components of the back office as well.

In an inactive state of the system (denoted as 'A' in FIG. 3), no work zone is formed/activated. In an active state of the system (denoted as 'B' in FIG. 3), a work zone is formed/activated remotely from the back office. In this regard, a back office dispatcher may (e.g., by interacting (150) with the server 180, which in turn interacts (160) with the anchors 130, with all these interactions taking place over the backbone 170) to remotely configure a work zone in a designated zone and to assign a work zone speed restriction. Such remote configuration of work zones may obviate the need to require workers to wear special equipment.

The anchors 130 would then give a visual and/or audible indication that the location is now set as a work zone. The back office may detect the location of a train via the anchor network, and may automatically alert (140) the train operator of the approach to a work zone as well as specific actions required (e.g., instruction to stop for a configurable period, to proceed at a restricted speed of 10 mph, or similar command). The anchor network may also be configured to provide audible and/or visual indications or alarms to the workers (e.g., via the anchors 130), such as when a train was approaching the work zone so that the workers know to move to a safe location.

An example system for worker protection, in accordance with the present disclosure, comprises one or more wayside units placed on or near a track, with each wayside unit comprising one or more circuits configured to transmit and/or receive wireless signals, with the signals comprising ultra-wideband (UWB) signals; to process transmitted and/or received signals; and to perform based on processing of the transmitted and/or received signals, one or more functions. The one or more wayside units are configured to form a work zone network based on UWB communications, corresponding to a work zone in an area surrounding or in proximity to the one or more wayside units. When the work zone network is formed, at least one wayside unit of the one or more wayside units is configured to obtain ranging information to a train traversing the track, based on communications of the UWB signals with at least one train-mounted unit deployed on the train, and the one or more wayside units are configured to generate, based on the ranging information, notifications relating to the train and/or the work zone.

In an example implementation, the at least one wayside unit is an anchor pre-installed at a particular location near the track.

In an example implementation, the at least one wayside unit is configured to determine, based on the ranging information, one or both of location and speed of the train.

In an example implementation, the one or more wayside units are configured to communicate at least a portion of the notifications to the at least one train-mounted unit.

In an example implementation, the notifications comprise control information for controlling operation of the train, and the one or more wayside units are configured to communicate the control information to the at least one train-mounted unit control.

In an example implementation, the notifications comprise alerts relating to the train, and the one or more wayside units are configured to provide the alerts to one or more workers operating on or near the track.

In an example implementation, the at least one wayside unit is configured to communicate with a remote system in a back office.

In an example implementation, the at least one wayside unit is configured to communicate to the remote system one or more of: ranging information, data obtained based on the ranging information, and the notifications.

In an example implementation, the at least one wayside unit is configured to receive from the remote system, information relating to configuring and/or controlling operations of the work zone network.

In an example implementation, the one or more wayside units are configured to form the work zone network in response to detecting, by at least one of the one or more wayside units, at least one personal device used or carried by at least one worker.

In an example implementation, the one or more wayside units are configured to form the work zone network in response to commands received from a remote system.

An example system for worker protection, in accordance with the present disclosure, comprises a train-mounted unit for use on a train, with the train-mounted unit comprising one or more circuits configured to transmit and/or receive wireless signals, with the signals comprise ultra-wideband (UWB) signals; to process transmitted and/or received signals; and to perform based on processing of the transmitted and/or received signals, one or more functions. The train-mounted unit is configured to communicate with one or more wayside units, configured for placement on or near a track traversed by the train, with the communication comprising communication of ultra-wideband (UWB) signals; and to operate cooperatively with the one or more wayside units, to support worker protection functions in a work zone in an area surrounding or in proximity to the one or more wayside units, with the train-mounted unit being configured to support ranging based on communications of the UWB signals with at least one of the one or more wayside units.

In an example implementation, the train-mounted unit is configured to receive a signal indicating presence of a worker in the work zone; and provide an indication of the presence of the worker to an operator of the train.

In an example implementation, the train-mounted unit is configured to receive a signal indicating an acknowledgment of a safety alert by a worker in the work zone; and provide an indication of the acknowledgement to an operator of the train.

In an example implementation, the train-mounted unit is configured to receive a signal comprising control information for controlling operation of the train in relation to the work zone; and provide feedback, relating to the control information, for outputting to an operator of the train.

In an example implementation, the train-mounted unit is configured to receive a signal comprising control information for controlling operation of the train in relation to the work zone; and generate based on the control information, control signals for controlling at least one other component of the train.

Aspects of the techniques described herein may be implemented in digital electronic circuitry, computer software, firmware, or hardware, including the structures disclosed herein and their structural equivalents, or in various combinations. Aspects of the techniques described herein may be implemented using a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Each of the computer programs may have, for example, one or more sets of program instructions residing on or encoded in the non-transitory computer-readable storage medium for execution by, or to control the operation of, one or more processors of the machine or the computer. Alternatively or in addition, the instructions may be encoded on an artificially-generated propagated signal, for example, a machine-generated electrical, optical, or electromagnetic signal that may be generated to encode information for transmission to a suitable receiver apparatus for execution by one or more processors.

A non-transitory computer-readable medium may be, or be included in, a non-transitory computer-readable storage device, a non-transitory computer-readable storage substrate, a random or serial access memory array or device, various combinations thereof. Moreover, while a non-transitory computer-readable medium may or may not be a propagated signal, a non-transitory computer-readable medium may be a source or destination of program instructions encoded in an artificially-generated propagated signal. The non-transitory computer-readable medium may also be, or be included in, one or more separate physical components or media (for example, CDs, disks, or other storage devices).

Certain techniques described in this specification may be implemented as operations performed by one or more processors on data stored on one or more computer-readable mediums or received from other sources. The term "processor" may encompass various kinds of apparatuses, devices, or machines for processing data, including by way of example a central processing unit, a microprocessor, a microcontroller, a digital-signal processor, programmable processor, a computer, a system on a chip, or various combinations thereof. The processor may include special purpose logic circuitry, for example, a field programmable gate array or an application-specific integrated circuit.

Program instructions (for example, a program, software, software application, script, or code) may be written in various programming languages, including compiled or interpreted languages, declarative or procedural languages, and may be deployed in various forms, for example as a stand-alone program or as a module, component, subroutine, object, or other unit suitable for use in a computing environment. Program instructions may correspond to a file in a file system. Program instructions may be stored in a portion of a file that holds other programs or data (for example, one or more scripts stored in a markup language document), in a dedicated file or in multiple coordinated files (for example, files that store one or more modules, sub-programs, or portions of code). Program instructions may be deployed to be executed on one or more processors located at one site or distributed across multiple sites connected by a network.

The present technology has now been described in such full, clear, concise and exact terms as to enable any person skilled in the art to which it pertains, to practice the same. It is to be understood that the foregoing describes preferred embodiments and examples of the present technology and that modifications may be made therein without departing from the spirit or scope of the invention as set forth in the claims. Moreover, it is also understood that the embodiments shown in the drawings, if any, and as described above are merely for illustrative purposes and not intended to limit the scope of the invention. As used in this description, the singular forms "a," "an," and "the" include plural reference such as "more than one" unless the context clearly dictates otherwise. Where the term "comprising" appears, it is contemplated that the terms "consisting essentially of" or "consisting of" could be used in its place to describe certain embodiments of the present technology. Further, all references cited herein are incorporated in their entireties.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for worker protection, the system comprises:
one or more wayside units placed on or near a track;
  wherein each wayside unit comprises one or more circuits configured to:
    transmit and/or receive wireless signals, wherein the signals comprise ultra-wideband (UWB) signals;
    process transmitted and/or received signals; and
    perform based on processing of the transmitted and/or received signals, one or more functions;
  wherein:
    the one or more wayside units are configured to form a work zone network based on UWB communications, corresponding to a work zone in an area surrounding or in proximity to the one or more wayside units; and
    when the work zone network is formed:
      at least one wayside unit of the one or more wayside units is configured to obtain ranging information to a train traversing the track, based on communications of the UWB signals with at least one train-mounted unit deployed on the train; and the one or more wayside units are configured to generate, based on the ranging information, notifications relating to the train and/or the work zone.

2. The system of claim 1, wherein at least one wayside unit is an anchor pre-installed at a particular location near the track.

3. The system of claim 1, wherein the at least one wayside unit is configured to determine, based on the ranging information, one or both of location and speed of the train.

4. The system of claim 1, wherein the one or more wayside units are configured to communicate at least a portion of the notifications to the at least one train-mounted unit.

5. The system of claim 1, wherein the notifications comprise control information for controlling operation of the train, and wherein the one or more wayside units are configured to communicate the control information to the at least one train-mounted unit control.

6. The system of claim 1, wherein the notifications comprise alerts relating to the train, and wherein the one or more wayside units are configured to provide the alerts to one or more workers operating on or near the track.

7. The system of claim 1, wherein at least one wayside unit is configured to communicate with a remote system in a back office.

8. The system of claim 7, wherein at least one wayside unit is configured to communicate to the remote system one or more of: ranging information, data obtained based on the ranging information, and the notifications.

9. The system of claim 7, wherein at least one wayside unit is configured to receive from the remote system, information relating to configuring and/or controlling operations of the work zone network.

10. The system of claim 1, wherein the one or more wayside units are configured to form the work zone network in response to detecting, by at least one of the one or more wayside units, at least one personal device used or carried by at least one worker.

11. The system of claim 1, wherein the one or more wayside units are configured to form the work zone network in response to commands received from a remote system.

12. A system for worker protection, the system comprises:
a train-mounted unit for use on a train, wherein the train-mounted unit comprises one or more circuits configured to:
transmit and/or receive wireless signals, wherein the signals comprise ultra-wideband (UWB) signals;
process transmitted and/or received signals; and
perform based on processing of the transmitted and/or received signals, one or more functions;
wherein:
the train-mounted unit is configured to communicate with one or more wayside units, configured for placement on or near a track traversed by the train, the communication comprising communication of ultra-wideband (UWB) signals; and
operate cooperatively with the one or more wayside units, to support worker protection functions in a work zone in an area surrounding or in proximity to the one or more wayside units, wherein the train-mounted unit is configured to support ranging based on communications of the UWB signals with at least one of the one or more wayside units.

13. The system of claim 12, wherein the train-mounted unit is configured to:
receive a signal indicating presence of a worker in the work zone; and
provide an indication of the presence of the worker to an operator of the train.

14. The system of claim 12, wherein the train-mounted unit is configured to:
receive a signal indicating an acknowledgment of a safety alert by a worker in the work zone; and
provide an indication of the acknowledgement to an operator of the train.

15. The system of claim 12, wherein the train-mounted unit is configured to:
receive a signal comprising control information for controlling operation of the train in relation to the work zone; and
provide feedback, relating to the control information, for outputting to an operator of the train.

16. The system of claim 12, wherein the train-mounted unit is configured to:
receive a signal comprising control information for controlling operation of the train in relation to the work zone; and
generate based on the control information, control signals for controlling at least one other component of the train.

* * * * *